J. H. ASTRUCK.
SMOKER'S UTENSIL.
APPLICATION FILED DEC. 8, 1911.
1,043,388.
Patented Nov. 5, 1912.
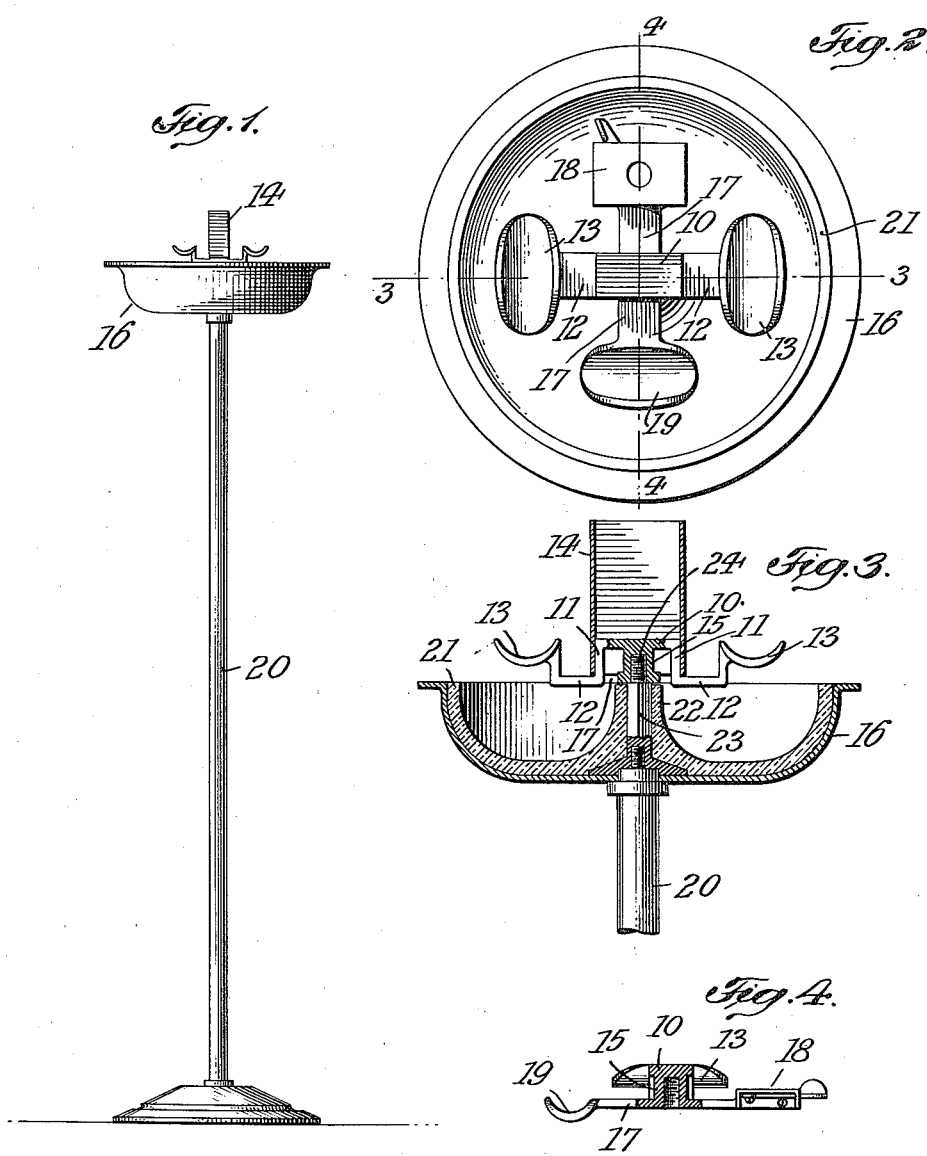
Witnesses:
Inventor
John H. Astruck
By his Attorneys

UNITED STATES PATENT OFFICE.

JOHN H. ASTRUCK, OF NEW YORK, N. Y.

SMOKER'S UTENSIL.

1,043,388.   Specification of Letters Patent.   Patented Nov. 5, 1912.

Application filed December 8, 1911. Serial No. 664,621.

*To all whom it may concern:*

Be it known that I, JOHN H. ASTRUCK, a citizen of the United States, residing at New York city, county and State of New York, have invented a new and Improved Smoker's Utensil, of which the following is a specification.

This invention relates to a smoker's utensil of novel construction and more particularly to improved means for assembling and conveniently presenting those devices which are in frequent demand by smokers, such as match boxes, cigar cutters, cigar rests and ash trays.

In the accompanying drawing: Figure 1 is a side elevation of a stand provided with a smoker's utensil embodying my invention; Fig. 2 a plan on an enlarged scale; Fig. 3 a cross section on line 3—3, Fig. 2, and Fig. 4 a cross section through the carrier on line 4—4, Fig. 2.

The utensil comprises essentially a plate or carrier, provided with a central upwardly extending yoke or saddle 10, the two depending shanks 11 of which are turned sidewise at their lower ends to form integral laterally extending arms 12 which are turned upwardly at their free ends. To these upwardly extending ends of arms 12 are secured cigar rests 13 which are thus raised a substantial distance above the bottom of saddle 10. The size of saddle 10 is such that it may be snugly straddled by a match box 14 which by being projected over the saddle is securely held in position and centered between the cigar rests. From saddle 10 there depends between shanks 11, a tapped hub 15, by which the device is adapted to be secured to the bowl 16 of a smoker's stand. At its lower end hub 15 carries a transverse plate 17 extending through the saddle at right angles to arms 12. Plate 17 is arranged in a horizontal plane materially lower than that of saddle 10, so as not to prevent the latter from being telescoped by the match box. To the free ends of plate 17 are secured additional devices for the convenience of smokers, such as a cigar cutter 18, and a third cigar rest 19, so that in this way the carrier comprises a match box holder, a cigar cutter and a plurality of cigar rests. Rests 13 are located in a higher horizontal plane than rest 19 and cutter 18, so that all the devices are so spaced as not to interfere with each other and to be readily accessible. The utensil constructed as described is fitted to the bowl 16 of smoker's stand 20, said bowl being adapted to properly support the utensil and also to constitute a container for the ashes.

As illustrated in Figs. 1–3, bowl 16 is provided with an annular trough shaped insert or lining 21 within a central projection 22 of which is anchored a core 23. This core is provided with an upwardly extending screw 24 adapted to engage tapped hub 15, so that in this way the utensil is removably secured to the center of the bowl.

I claim:

1. A smoker's utensil comprising a carrier having a centrally disposed saddle, arms projecting laterally therefrom, smokers' devices carried by said arm, a member depending from the saddle, a transverse plate secured to said member and extending through the saddle, and additional smokers' devices carried by the transverse plate.

2. A smoker's utensil comprising a carrier having a centrally disposed saddle, arms projecting laterally therefrom, smokers' devices carried by said arm, a hub depending from the saddle, a transverse plate secured to the hub, additional smokers' devices carried by the transverse plate, an ash bowl, and means for securing the hub to said bowl.

JOHN H. ASTRUCK.

Witnesses:
FRANK V. BRIESEN,
KATHERYNE KOCH.